3,176,294
VEHICLE RADAR SYSTEM
Angelo L. Merlo, Troy, and Richard T. Seeger, Dearborn, Mich., assignors to The Bendix Corporation, a corporation of Delaware
Filed Oct. 2, 1959, Ser. No. 844,031
15 Claims. (Cl. 343—7)

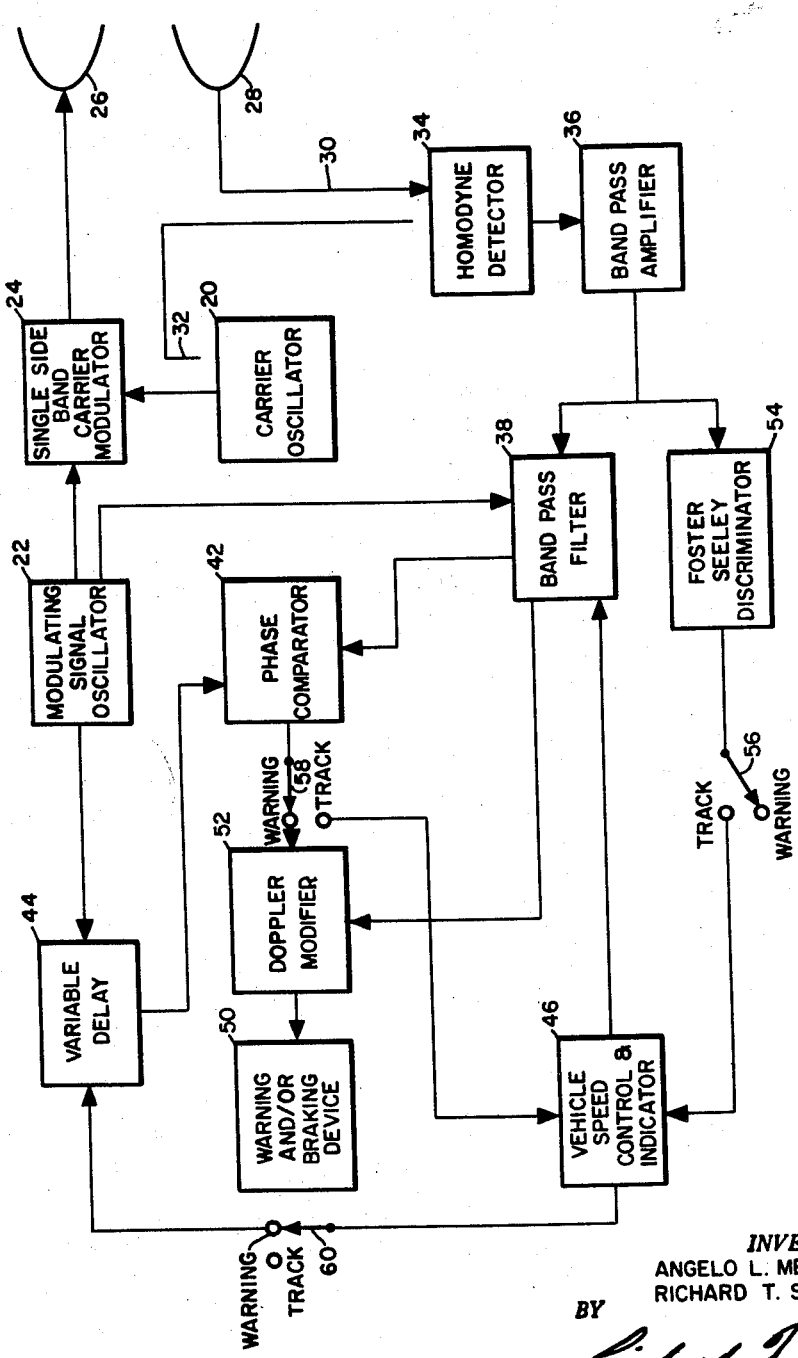

This invention pertains to a vehicular radar system and, more particularly, to a radar system for developing a signal for warning or braking when a first vehicle has reached a distance behind a second vehicle or obstacle, which distance is proportional to the first and second vehicles' speed, with means for distinguishing between opening and closing distances between the two vehicles.

It is an object of this invention to provide a vehicular radar system wherein a signal for warning or braking is developed comprising means for transmitting a high frequency signal from a transistor to a second vehicle or object, means for receiving the reflection of the transmitted signal, means for delaying a second signal from the high frequency transmitter in proportion to vehicle speed and comparing the phase of the reflected and delayed signals, with any phase difference causing a corresponding voltage to be sent to a Doppler modifier and then to a warning device or vehicle speed control until the phases are in a predetermined agreement.

It is another object of this invention to provide a vehicular radar system for producing a signal for warning or braking the vehicle by single side band amplitude modulating a high frequency signal, having means for transmitting the modulated signal from a transmitter to a second vehicle or object, means for receiving the reflections of the transmitted signal, means for homodyne detecting of the reflected signal to obtain the modulating frequency, means for phase delaying a second modulating frequency in accordance with vehicle speed and phase comparing the delayed modulated frequency with the detected reflected frequency to establish a voltage corresponding to any phase difference, which is modified by the Doppler signal due to a closing movement between vehicles, for controlling the speed of the first vehicle.

It is a further object to provide in such a single side band system, filter means which discriminates between opening and closing vehicle movements by passing the Doppler signal developed by closing vehicle movement and rejecting the Doppler signal developed by opening vehicle movement.

These and other objects will become more apparent when a preferred embodiment is considered in connection with a drawing showing a block diagram of the preferred embodiment.

In the drawing is shown a radio frequency oscillator 20 for generating a high frequency carrier signal. Modulating signal oscillator 22 generates a signal with a constant frequency which is selected so that it can be unambiguously phase compared in normal vehicle application to determine vehicle distance from an object as later explained. The wavelength of the modulating signal is preferably more than twice the maximum distance for which the system is designed. A single side band modulator 24 modulates the signal from the RF oscillator 20 with the signal from modulator oscillator 22 and is connected to a transmitting antenna 26 which may be fastened to a vehicle grill or other suitable vehicle portion and directed toward the intended vehicle path.

A receiving antenna 28 is provided, preferably in concentric relation with antenna 26, and is connected to a coupler 30. Also connected to coupler 30 by means of a coupler 32 is a signal from oscillator 20 and the output of coupler 30, which is the sum of the carrier signal and a reflected signal, is passed to a homodyne detector 34 where the carrier portion of the reflected signal is removed. The output of the detector, which contains the modulated signal plus or minus any Doppler frequency which is caused by any relative velocity difference between the first vehicle and a second vehicle or object, is connected to a band pass amplifier 36 which is designed to pass and amplify a wide band of frequencies extending from just below the modulator frequency to the modulator frequency plus the maximum desired change in frequency due to velocity difference between the first vehicle and an object.

The amplified signal from amplifier 36 is then sent to adjustable band pass filter 38. Since a single side band signal is utilized in this system, the frequencies received by antenna 28 corresponding to opening distances between vehicles are separate from the frequencies corresponding to closing distances between vehicles. The opening frequencies can then be rejected by proper adjustment of band pass filter 38. This is desirable since there is no danger when vehicles are moving away from one another and this prevents warning or braking during such condition. Also, when vehicles approach each other, as they would in opposite moving adjacent lanes, the closing frequency is very high and the band passed by filter 38 can be adjusted to exclude these frequencies if desired. This would be advantageous if the antennas used tend to pick up signals of vehicles in an adjacent lane. By connecting control 46 to filter 38, as shown, the high end of the frequency band that is passed can be varied according to the vehicle speed. Preferably the maximum frequency passed is never greater than the closing Doppler frequency that corresponds to the vehicle approaching a stationary object, plus any desired increment. This automatically excludes closing Doppler frequencies due to approaching vehicles at any vehicle speed.

A phase comparator 42 receives signals from band pass filter 38 and a variable delay 44, which receives a modulator signal from oscillator 22 and then delays this signal automatically corresponding to the vehicle's speed, which is received from a vehicle speed indicator 46. Phase comparator 42 compares the signal from variable delay 44 and the signal from filter 38 and then produces a voltage, corresponding to any phase difference, for actuating a warning and/or braking device 50 through a Doppler modifier 52 which modifies the signal going to warning and/or braking device 50 according to the Doppler frequency present in the received signal. When the Doppler signal is high, indicating a large speed differential between the first vehicle and the second vehicle or object, the signal attenuation to device 50 will be correspondingly low; but when the Doppler frequency is low, indicating a small or low speed differential between the first vehicle and any obstacle, the signal attenuation to device 50 will be correspondingly high so that a warning will not be given as soon. This is desirable since the stopping distance required when following a vehicle going at approximately the same speed as the first vehicle is less than the stopping distance required when following a vehicle going at a much slower rate of speed.

Also, this system discriminates against opening Doppler signals due to the single side band transmitted frequency and selective filter. Due to the single side band transmission, an opening Doppler signal will appear as one frequency and a closing Doppler signal will appear as a second frequency with it being possible to discriminate between the frequencies. All frequencies having Doppler components due to an opening movement between vehicles are ignored because they fall out of the band pass filter 38. The closing Doppler frequencies are allowed to reach modifier 52. This is also desirable since there is no danger when the distance between vehicles is opening and, therefore, no signal is desired at this time.

Also shown in the drawings are means for a first vehicle tracking a second vehicle or, in other words, remaining a predetermined distance behind a second vehicle. A Foster-Seeley frequency discriminator 54 is connected to the output of amplifier 36 and is connectable through switch 56 to vehicle speed control 46. Discriminator 54 emits a plus voltage when the frequency of the signal received from amplifier 36 is greater than the frequency of modulating signal oscillator 22, indicating a closing Doppler frequency, and a minus voltage when the frequency of the signal received from amplifier 36 is less than the frequency of modulating signal oscillator 22, indicating an opening Doppler frequency. When speed control 46 receives a plus signal from discriminator 54 it will decelerate the vehicle, and when it receives a minus signal from discriminator 54 it will accelerate the vehicle. Switch 58 is movable to a lower position to connect phase comparator 42 to speed control 46. Switch 60 is movable to break the connection between vehicle speed control and indicator 46 and variable delay 44, at which time delay 44 can be adjusted manually. Phase comparator 42 is connectable to vehicle speed control 46 through a switch 58 and when so connected transmits a signal corresponding to any phase difference between delay 44 and the reflected signal from filter 38 and this signal overrides the discriminator signal 54 until the delay signal and the reflected signal agree in phase. Delay 44 may be set manually to determine the distance the operator of the first vehicle desires to remain behind a second vehicle. After this distance has been attained, the discriminator 54 very accurately maintains the distance.

By moving switches 56, 58, and 60 from the warning position as shown to the track positions, the vehicle may track a second vehicle staying a predetermined distance behind the second vehicle without the operator exercising any speed control, such as acceleration, deceleration and braking. If desired, however, switch 60 may remain in the warning position so that the distance between the two tracking vehicles will vary in accordance with the vehicle speed, with a greater distance being between vehicles for higher vehicle speed.

When the system is operating on track mode, it is desirable only to pass a band of frequencies which are closely adjacent to the modulating signal frequency since in this mode of operation it is desired to maintain a constant distance behind a second vehicle and the opening and closing Doppler frequencies would be at a minimum. Therefore, filter 38 would pass one band of frequencies for the warning mode operation and a second, narrower band of frequencies for the track mode operation. When the system is set for warning or track mode operation, this selection is automatically made.

The Doppler modified warning and/or braking device operates in the following manner. A carrier frequency from oscillator 20 is single side band amplitude modulated by a modulator 24 which receives a modulating signal from oscillator 22 and the modulated signal is sent to transmitting antenna 26, which is directed towards and along the vehicle path. Reflections from a second vehicle or obstacle in the path are received by antenna 28 and sent to homodyne detector 34 where the carrier frequency is removed. The output of detector 34 passes through amplifier 36 where a desired range of frequencies is passed and amplified and sent to filter 38. Filter 38 is adjusted to pass closing Doppler frequencies but reject opening Doppler frequencies and this is possible due to single side band modulation.

The signal from filter 38 is sent to a phase comparator 42 and Doppler modifier 38. Also sent to phase comparator 42 is a modulator signal from oscillator 22 which has been delayed by delay 44 by an amount corresponding to the vehicle speed with the greater the vehicle speed the greater the delay. This delay corresponds to a desired distance between the first and second vehicles for a given speed of the first vehicle and if it is not in agreement with comparator 42, a signal will be sent to warning and braking device 50 through Doppler modifier 52 to slow the vehicle and/or warn the vehicle operator that the distance between himself and the obstacle in his path is too small. Filter 38 passes only closing Doppler signals to modifier 52 which increasingly attenuates the signal to device 50 as the Doppler signal becomes smaller indicating a smaller speed differential between vehicles. The comparator 42 is designed so that it will not emit a signal for distances that are too large thus providing a range cut off to prevent distant objects picked up when traveling curves or hills from actuating the system. The variable delay is automatically changed by a signal developed by control 46 which is proportional to vehicle speed so that as vehicle speed increases, the variable delay is increased giving a warning at a greater distance.

A device of this invention may also be placed rearwardly of the vehicle and attached to exterior and/or interior warning devices to give warning of vehicles in the rear which are approaching at excessive speeds.

If desired, switch 60 can remain in the warning position so that the distance between the two tracking vehicles will vary in accordance with the vehicle speed, with a greater distance being between vehicles for higher vehicle speed. Also, the modulating oscillator 22 is connected to filter 38 in order to supply a modulating signal frequency reference.

Although this invention has been disclosed and illustrated with reference to particular application, the principles involved are susceptible of numerous other applications which will be apparent to persons skilled in the art. The invention is, therefore, to be limited only as indicated by the scope of the appended claims.

Having thus described our invention, we claim:

1. A vehicular radar system for signifying closing movements between a vehicle and an object in the path of said vehicle comprising means for transmitting a single side band high frequency signal, means for receiving the reflections of said signal, the received signal having opening and closing Doppler signals therein caused respectively by opening and closing movements between the vehicle and the object in the path of said vehicle, means for discriminating between opening and closing Doppler frequencies in the reflections of said single side band signal, means for emitting an electrical signal when there is a closing Doppler signal, and means for altering said electrical signal in accordance with the frequency of the closing Doppler signal.

2. A vehicular radar system for signifying closing movements between a vehicle and an object in the path of said vehicle comprising means for transmitting a single side band high frequency signal, means for receiving the reflections of said signal, the received signal having opening and closing Doppler signals therein caused respectively by opening and closing movements between the vehicle and the object in the path of said vehicle, means for delaying the transmitted signal in accordance with vehicle speed, means for comparing the phase of the output of said last means with the phase of the reflected signal, and emitting a signal when the phase difference is greater than a predetermined level, filter means for discriminating between opening and closing Doppler frequencies in the reflections of said single side band signal, means connected to said filter means for attenuating said electrical signal from said phase comparing means in inverse proportion to the frequency of a closing Doppler signal, a vehicle warning device, a vehicle velocity control device means responsive to said filtered, phase compared and attenuated signal for actuating said vehicle warning and control device.

3. A vehicular radar system for signifying closing movements between a vehicle and an object in the path of said vehicle comprising means for transmitting a high frequency signal towards objects having velocitities different than the vehicle velocity so that Doppler frequencies occur in the reflections from the object, means for receiving the reflections of said signal, means for delaying the transmitted signal in accordance with vehicle speed, means for comparing the phase of the output of said last means with the phase of the reflected signal, and emitting a signal when the phase difference is greater than a predetermined level, means for attenuating said emitted signal in inverse proportion to the frequency of a Doppler signal in said reflected signal.

4. A vehicular radar system for signifying closing movements between a vehicle and an object in the path of said vehicle comprising means generating a modulating signal, means for generating a carrier signal, means for single side band modulating said carrier, means for transmitting said modulated carrier, means for receiving the reflections of said transmission, means for detecting the reflected signal to remove the carrier, signal delaying means, said means for generating a modulating signal being connected to said signal delaying means, phase comparing means for comparing said reflected signal and said delayed modulating signal, a Doppler modifying device being connected to the output of said phase comparing means for varying said output in inverse ratio to the frequency of the Doppler portion of the reflected signal, frequency discriminator means being connected between said Doppler modifying device and said signal receiving means for discriminating against opening Doppler signals whereby said system is sensitive only to closing Doppler signals, a vehicle warning device, a vehicle velocity control device means for receiving the output of said Doppler modifier for performing said warning and vehicle control functions.

5. The vehicular radar system of claim 4 wherein the frequency of said modulating signal is chosen so that its wavelength is at least twice the maximum distance from the vehicle which is desired for detection.

6. A radar system for signifying closing movements between a vehicle and an object in the path of said vehicle comprising means for transmitting a single side band signal, the received signal having opening and closing Doppler signals therein caused respectively by opening and closing movements between the vehicle and the object in the path of said vehicle, means for receiving said signal, means for discriminating between opening and closing Doppler frequencies in said received single side band signal, means for emitting an electrical signal when there is a closing Doppler signal, and means for altering said electrical signal in accordance with the frequency of the closing Doppler signal.

7. A vehicular radar system for signifying closing movements between a vehicle and an object in the path of said vehicle comprising means for transmitting a single side band high frequency signal, means for receiving the reflections of said signal, the received signal having opening and closing Doppler signals therein caused respectively by opening and closing movements between the vehicle and the object in the path of said vehicle, means for delaying the transmitted signal in a predetermined manner, means for comparing the phase of the output of said last means with the phase of the reflected signal, and emitting a signal when the phase difference is greater than a predetermined level, filter means for discriminating between opening and closing Doppler frequencies in the reflections of said single side band signal, means connected to said filter means for attenuating said electrical signal from said phase comparing means in inverse proportion to the frequency of a closing Doppler signal, a vehicle warning device, a vehicle velocity control device means responsive to said filtered, phase compared and attenuated signal for actuating said vehicle warning and control device.

8. A vehicular radar system for signifying closing movements between a vehicle and an object in the path of said vehicle comprising means for transmitting a single side band high frequency signal, means for receiving the reflections of said signal, the received signal having opening and closing Doppler signals therein caused respectively by opening and closing movements between the vehicle and the object in the path of said vehicle, means for delaying the transmitted signal in accordance with vehicle speed, filter means for rejecting opening Doppler signals in said reflections, means for comparing the phase of the output of said relaying means with the phase of the filtered reflected signal, and emitting a signal when the phase difference is greater than a predetermined level, means connected to said filter means for attenuating the electrical signal from said phase comparing means in inverse proportion to the frequency of a closing Doppler signal, a vehicle warning device, a vehicle velocity control device means responsive to said filtered, phase compared and attenuated signal for actuating said vehicle warning and control device.

9. A vehicular radar system comprising means for transmitting a high frequency signal towards objects having velocities different than the vehicle velocity so that Doppler frequencies occur in the reflections from the object, means for receiving the reflections of said signal, means for delaying the transmitted signal in accordance with vehicle sped, means for comparing the phase of the output of said last means with the phase of the reflected signal, and emitting a signal when the phase difference is greater than a predetermined level, means for attenuating said emitted signal in accordance with the frequency of a Doppler signal in said reflected signal.

10. A vehicular radar system for signifying closing movements between a vehicle and an object in the path of said vehicle comprising means generating a modulating signal, means for generating a carrier signal, means for single side band modulating said carrier, means for transmitting said modulated carrier, means for receiving the reflections of said transmission, the received signal having opening and closing Doppler signals therein caused respectively by opening and closing movements between the vehicle and the object in the path of said vehicle, means for homodyne detecting the reflected signal to remove the carrier, signal delaying means, said means for generating a modulating signal being connected to said signal delaying means, phase comparing means for comparing said reflected signal and said delayed modulating signal, a Doppler modifying device being connected to the output of said phase comparing means for varying said output in inverse ratio to the Doppler portion of the reflected signal, frequency discriminator means being connected between said Doppler modifying device and said signal receiving means for discriminating against opening Doppler signals whereby said system is sensitive only to the frequency of closing Doppler signals, a vehicle warning device, a vehicle velocity control device means for receiving the output of said Doppler modifier for performing said warning and vehicle control functions.

11. The vehicular radar system of claim 2 with means connected to said receiving means for emitting a voltage in proportion to any frequency difference between the received signal and said high frequency signal, vehicle speed control means being connected to said last means to control vehicle speed in accordance with said voltage outputs, and means for connecting said phase comparing means to said last means.

12. The vehicular radar system of claim 4 with means connected to said receiving means for emitting a voltage in proportion to any frequency difference between the received signal and said modulating signal, vehicle speed control means being connected to said last means to control vehicle speed in accordance with said voltage outputs, and means for connecting said phase comparing means to said last means.

13. The vehicular radar system of claim 7 with means connected to said receiving means for emitting a voltage in proportion to any frequency difference between the received signal and said high frequency signal, vehicle speed control means being connected to said last means to control vehicle speed in accordance with said voltage outputs, and means for connecting said phase comparing means to said last means.

14. The vehicular radar system of claim 9 with means connected to said receiving means for emitting a voltage in proportion to any frequency difference between the received signal and said high frequency signal, vehicle speed control means being connected to said last means to control vehicle speed in accordance with said voltage outputs, and means for connecting said phase comparing means to said last means.

15. A radar system comprising means for transmitting a single sideband high frequency signal, means for receiving reflections of said signal, the received signal having opening and closing Doppler signals therein caused respectively by opening and closing movements between the vehicle and the object in the path of said vehicle, means for emitting an electrical signal corresponding to any Doppler frequency present in said reflected signal, and means for altering said electrical signal in accordance with said Doppler frequency.

References Cited by the Examiner
UNITED STATES PATENTS

| | | | |
|---|---|---|---|
| 2,236,893 | 12/39 | Chaffee | 343—14 |
| 2,804,160 | 8/57 | Rashid | 343—8 |

CHESTER L. JUSTUS, *Primary Examiner.*

FREDERICK M. STRADER, *Examiner.*